United States Patent [19]
Hajek

[11] Patent Number: 5,462,479
[45] Date of Patent: Oct. 31, 1995

[54] WILD GAME DRESSING TOOL

[75] Inventor: Michael L. Hajek, R.R. 2 Box 188, Staples, Minn. 56479

[73] Assignee: Michael L. Hajek, Staples, Minn.

[21] Appl. No.: 335,252

[22] Filed: Nov. 7, 1994

[51] Int. Cl.$^6$ ............................ A22B 5/20; B23D 49/11; B27D 21/00
[52] U.S. Cl. ................ 452/160; 30/520; 83/788
[58] Field of Search ................ 452/160; 83/788, 83/651.1; 30/380, 298, 312, 314, 520

[56] References Cited

U.S. PATENT DOCUMENTS

| | | | |
|---|---|---|---|
| 2,749,949 | 6/1956 | Tramerye | 30/520 |
| 4,047,504 | 9/1977 | Borba et al. | 30/520 |
| 4,240,203 | 12/1980 | Johnson | 30/520 |
| 4,856,193 | 8/1989 | Grachan | 30/520 |

FOREIGN PATENT DOCUMENTS

| | | | |
|---|---|---|---|
| 2693138 | 1/1994 | France | 30/520 |
| 373074 | 4/1923 | Germany | 30/520 |

*Primary Examiner*—Willis Little

[57] ABSTRACT

A wild game dressing tool that is light in weight and small in size, comprising two handles connected by a saw blade for field dressing a deer or the like: the tool offers a quick, safe, and easy way to split an animal's pelvic bone, allowing better cleaning of the anal area and thereby resulting in more consistent, high quality meat.

4 Claims, 2 Drawing Sheets

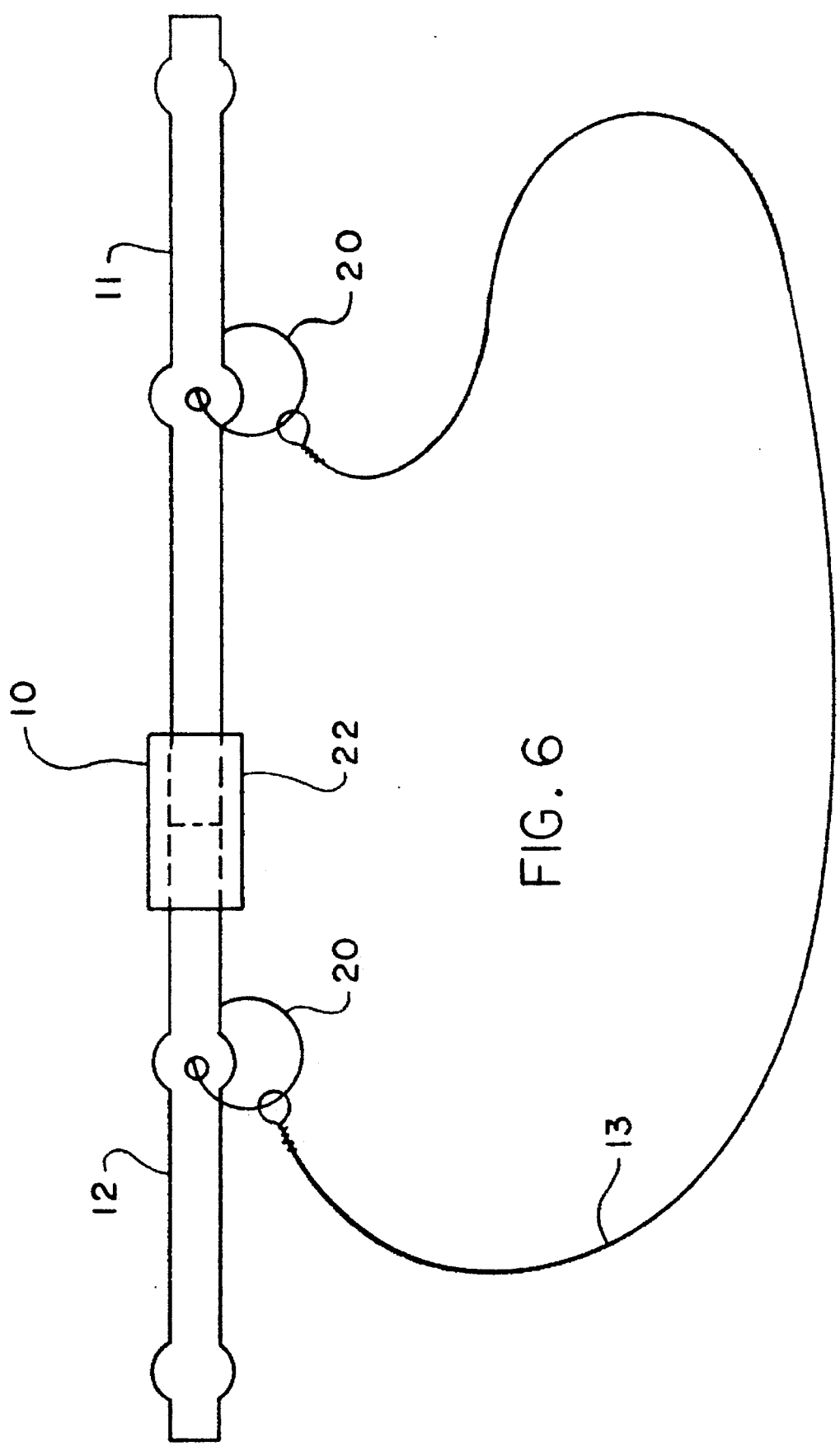

5,462,479

WILD GAME DRESSING TOOL

BACKGROUND OF THE INVENTION

The present invention relates generally to the art of dressing out big game wildlife, and in particular to the art of splitting the pelvic bone of the carcass apart to facilitate cleaning out the internal organs.

In this art it is necessary to split the pelvic bone apart in order to clean the anal area. The pelvic bone is the structural link that holds the rear legs together. When the pelvic bone is seperated, the rear legs will fall to the sides and the field dresser can clean the anal area with ease.

Techniques, such as the use of knives have been used in the past. Also, other methods have been to use various saws. Often times hunters cut themselves when they are attempting the operation of severring the pelvic bone or they spend a great deal of time performing this operation. Also, ordinary saws and knives result in jagged edges and possible bone frayings in the meat which can lead to problems at the time of eating, The present invention represents a major advance in the art of field dressing big game animals. In the past, hunters have not been able to field dress an animal without the help of another, or by use of archaic methods such as knives or common saws.

SUMMARY OF THE INVENTION

An advantage of the present invention is that it provides a means of separating an animal's pelvic bone for the purpose of removing its internal organs.

Another advantage of the present invention is that it is much easier to use and offers much quicker results with higher quality meat.

Still another advantage of the present invention is that prevents the puncturing of entrails and eliminates harmful bone chips and splinters while providing smooth edges that allow the field dresser to work without cutting himself on jagged edges of a roughly split pelvic bone.

A further advantage of the present invention is that it is lightweight and small in size which is a benefit when packing and carrying it.

The general operation of the present invention is described herein to provide an understanding of the overall invention. Simply, this is a device for use by a hunter in the field after having just slain an animal for game.

In the general operation of the present invention, after the game animal has been slain and the internal organs exposed, it facilitates the dressing of the pelvic area.

The applicant's device is removed from the carrying pouch where it can be nested in place along with its extension and a knife, etc. While kneeling, and with the tool assembled in rod-like alignment, insertion configuration, insert the tool in under the pelvic bone until the inserted end of the tool can be seen and handled. The tool is then pulled apart and each end becomes a handle with a surgical chain saw blade holding them together. While holding the handle across the fingers of each hand, the surgical chain saw wire going out between two of the fingers of each hand, the pelvic bone is cut in two by pulling upward and back-n-forth, first with one arm and then the other. After the pelvic bone is severred, the tool can the be coiled and put together, then placed back in its storage case. When the blade wears out, it can be replaced easily, in the field or any where with a replacement blade. Several replacement blades can be carried in the storage case along with a fully assembled tool at all times.

A feature of the present invention is its ability to transform simply from its insertion arrangement to its sawing configuration and stowed in nested fashion in a handy carry pouch, allowing other tools, such as a knife, flashlights, tool extensions, other dressing tools, etc., to be carried as well.

A further feature of the present invention is that sawing occurs while pulling up rather than pushing down. This brings about faster results, is safer, and yields a smoother cut.

Another feature of the present invention is its ability to readily receive an extension and consequently be used on larger animals in exactly the same way.

Still, another feature of the present invention is its light weight and small size, allowing it to be packed and carried easier than previous tools.

An object of the present invention is to provide an easier and neater means of field dressing a big game animal.

It is anticipated that certain changes related to the size and shape and method of construction of the present invention can be made without appreciably departing from the present invention. It is also anticipated that certain components may be joined together or integrated to offer a variety of advantages without departing from the present invention.

BRIEF DESCRIPTION OF THE DRAWINGS

FIGS. 1 and 6 show an assembled view of the preferred embodiment the present invention, in the insertion configuration.

DETAILED DESCRIPTION OF THE PREFERRED EMBODIMENT

Figure 1:
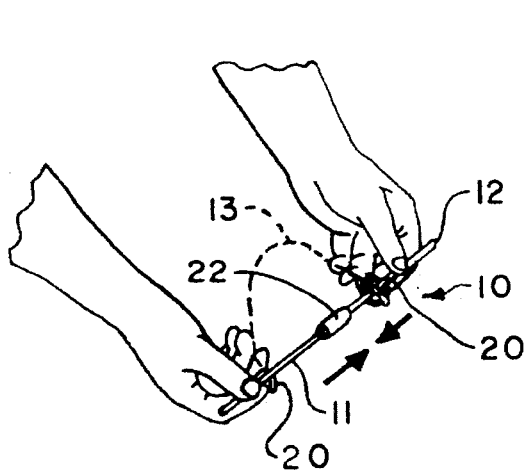

The present invention herein is generally described as a wild game dressing tool, 10, which, referring to FIGS. 1 and 6, consists of three parts. The first handle, 11, the second handle, 12, and a saw blade, 13, make up the tool and are fixed to one another. The first and second handles each posess an attachment means, 20, which receives the saw blade, 13, at each end. The second handle is distinguished from the first handle by a tubular coupling, 22, which is an integral part of the second handle, 12. An extension is similar in that it would also posesses a tubular coupling which would be an integral part of the extension.

Figure 5:
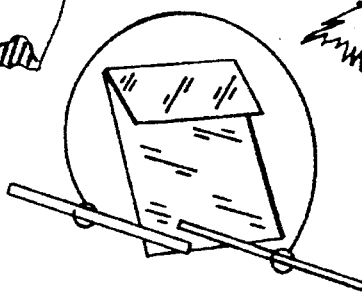
FIG. 5 shows the present invention as it would be nested and carried in its handy carrying pouch that can hang from the hunter's belt.

Referring to FIG. 5, the tool can be carried and nested in a handy carrying case.

Figure 2:
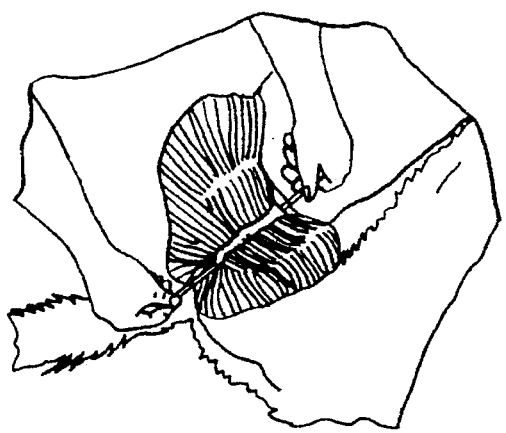
FIG. 2 is an illustration of the present invention while it is being inserted under a pelvic bone of an animal.
Figure 3:
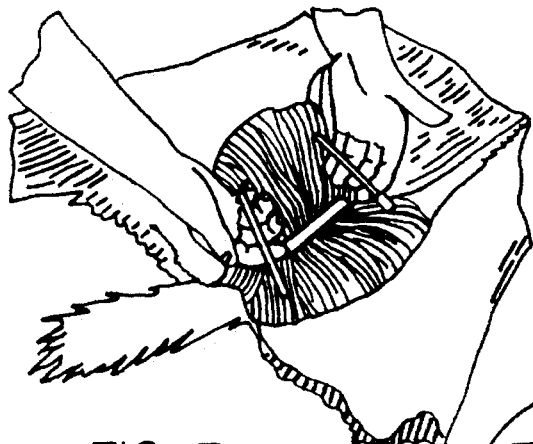
FIGS. 3 and 4 show the present invention as it is being used and applied.
Figure 4:
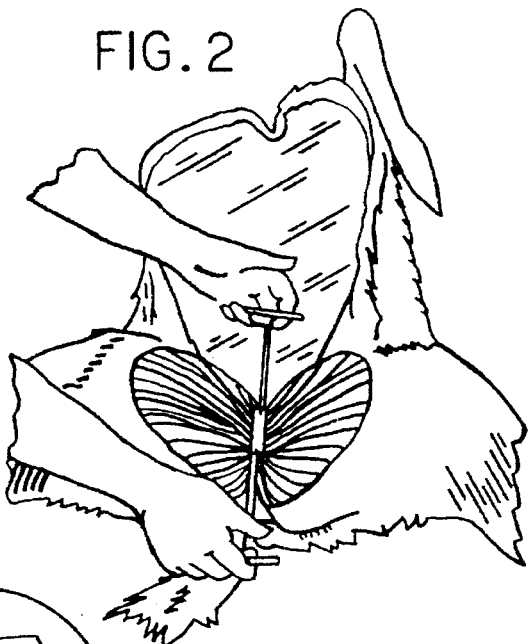

Referring to FIGS. 1 and 6, the first handle, 11, fits into the second handle, 12, or it can fit into an extension, and the extension would then fit into the second handle, 12, creating the insertion configuration. The tool assembly is then pushed into the animal's carcass under the pelvic bone, as shown in FIG. 2. When the tool appears on the other side of the pelvic bone, the first handle is pulled away from the second handle, as shown in FIG. 3, and the field dresser initiates sawing action by pulling up and back-and-forth on the saw blade with the handles, as shown in FIG. 4. After the pelvic bone is cut into two halves, the tool is stored into its handy carrying case, as shown in FIG. 5.

That which is claimed is:

1. A wild game dressing tool comprising a first elongated handle, a second elongated handle, and a saw blade, the second handle having an integral tubular coupling formed at one end thereof which slideably receives an abutting end of the first handle, and the first and second handles being connected to the saw blade at each end of the saw blade by an attachment means.

2. The device of claim 1, wherein: an extension can be inserted which posesses both a male and a female end created by a similar coupling and consequently works to increase length of the tool.

3. The device of claim 1, wherein when both handles have recieved each other forming one single unit, each opposite end of the complete device posesses an abrasive dented formation forming a finger grip for easy pushing and pulling the device when used in the application and use process.

4. A method for cutting the pelvic bone of a wild game to be dressed comprising:

providing a tool comprising first and second detachably joined, elongated handles having a saw blade connected and extending therebetween;

exposing the pelvic bone of the wild game;

making an incision inward from the backside of the animal just below the pelvic bone to provide an exit opening;

joining the first and second elongated handles and threading said handles under the pelvic bone until one handle end extends through and beyond said opening;

detaching the first and second handles leaving the saw extending under the pelvic bone;

sawing the pelvic bone by pulling the handles side-to-side while applying a light upward pressure.

* * * * *